US008280020B2

(12) United States Patent
Vinokurov et al.

(10) Patent No.: US 8,280,020 B2
(45) Date of Patent: Oct. 2, 2012

(54) TRANSPARENT CALLER NAME AUTHENTICATION FOR AUTHORIZED THIRD PARTY CALLERS

(75) Inventors: Dmitri Vinokurov, Ottawa (CA); Stanley TaiHai Chow, Ottawa (CA); Vinod Kumar Choyi, Ottawa (CA)

(73) Assignee: Alcatel Lucent, Paris (FR)

( * ) Notice: Subject to any disclaimer, the term of this patent is extended or adjusted under 35 U.S.C. 154(b) by 1638 days.

(21) Appl. No.: 11/702,555

(22) Filed: Feb. 6, 2007

(65) Prior Publication Data
US 2008/0187119 A1 Aug. 7, 2008

(51) Int. Cl.
H04M 3/42 (2006.01)
H04M 11/00 (2006.01)
H04M 3/436 (2006.01)
H04L 9/08 (2006.01)
H04M 3/523 (2006.01)

(52) U.S. Cl. ........... 379/201.01; 379/93.03; 379/142.05; 379/188; 379/196; 379/265.01; 379/265.09; 380/282; 380/285; 713/156; 713/157; 713/158

(58) Field of Classification Search ............... 379/93.02, 379/93.03, 188, 189, 196, 197, 201.01; 380/277, 380/278, 279, 282, 285; 713/150, 155, 156, 713/157, 158
See application file for complete search history.

(56) References Cited

U.S. PATENT DOCUMENTS

| | | | |
|---|---|---|---|
| 6,324,271 B1 | 11/2001 | Sawyer et al. | |
| 6,324,645 B1 * | 11/2001 | Andrews et al. | 713/157 |
| 6,792,531 B2 * | 9/2004 | Heiden et al. | 713/156 |
| 6,859,527 B1 * | 2/2005 | Banks et al. | 379/106.03 |
| 6,934,840 B2 * | 8/2005 | Rich et al. | 713/156 |
| 7,028,181 B1 * | 4/2006 | McCullough et al. | 713/156 |
| 7,209,563 B1 * | 4/2007 | Calvez et al. | 713/156 |
| 7,239,688 B1 * | 7/2007 | Sayko et al. | 379/93.02 |
| 7,313,689 B2 * | 12/2007 | Falch et al. | 713/155 |
| 7,512,785 B2 * | 3/2009 | Brickell | 713/156 |
| 7,873,154 B2 * | 1/2011 | Chandrasekharan et al. | 379/265.02 |
| 2002/0078347 A1 * | 6/2002 | Hericourt et al. | 713/156 |
| 2003/0115457 A1 * | 6/2003 | Wildish et al. | 713/157 |
| 2005/0120207 A1 * | 6/2005 | Hines et al. | 713/158 |
| 2005/0201363 A1 | 9/2005 | Gilchrist et al. | |
| 2006/0018445 A1 | 1/2006 | Mittal | |
| 2006/0120377 A1 | 6/2006 | Caballero-McCann et al. | |
| 2008/0181379 A1 * | 7/2008 | Chow et al. | 379/142.05 |

* cited by examiner

*Primary Examiner* — Harry Hong
(74) *Attorney, Agent, or Firm* — Kramer & Amado, P.C.

(57) ABSTRACT

Transparent caller name authentication is provided to authorized third parties by creating an Public Key Infrastructure (PKI) certificate chain. An owner of a registered caller name can authorize third parties to use the caller name by issuing a PKI sub-certificate to each authorized third party. An authenticated caller name displays the owner's name to the called party. Outsourcing and mobile employment is thereby facilitated, and called party confusion is reduced.

18 Claims, 3 Drawing Sheets

TRANSPARENT CALLER NAME AUTHENTICATION FOR AUTHORIZED THIRD PARTY CALLERS

CROSS-REFERENCE TO RELATED APPLICATIONS

This is the first application filed for the present invention.

MICROFICHE APPENDIX

Not Applicable.

TECHNICAL FIELD

The present invention relates in general to the provision of telephone services over a packet network and/or switched circuit network and, in particular, to caller name authentication that may be delegated to trusted third parties, such as outsourced service suppliers, mobile employees, or the like.

BACKGROUND OF THE INVENTION

Caller name may now be authenticated to a called party to prevent caller identity spoofing, as described in Applicant's co-pending U.S. patent application Ser. No. 11/699,330, entitled Caller Name Authentication to Prevent Caller Identity Spoofing, which was filed on Jan. 30, 2007, the entire specification of which is incorporated herein by reference.

However, under certain circumstances when the authenticated name of a calling party is displayed on the called party's telephone, it may confuse the called party and make them suspicious. As is well known, many companies now outsource certain services. It is not uncommon for a company to outsource either sales or support services, or both. Consequently, if a customer places a call for assistance with a product or service from sales or support of "Company X", the customer naturally expects a return call from the Company X. However, if Company X has outsourced their sales or support services to company Y (perhaps, in another country), or a support specialist for Company X calls from an outside location (e.g., an IP telephone application on a laptop computer), the authenticated caller name may display "Company Y", or "John Doe" while the caller is alleging that they are making the call in response to the Company X matter. Since a call from neither Company Y nor John Doe was expected, the called customer may become suspicious and refuse to take the call. Furthermore, Company Y may be a call center that serves several other companies besides Company X, so the customer may become even more suspicious if they receive two or more calls from the same unexpected source in response to apparently unrelated inquiries.

Of course, it would be possible for company X to register its caller name "Company X", as explained in Applicant's above-identified co-pending patent application, and give the certificate it was issued (along with the corresponding private key) to company Y and/or to roaming employees. However, that is very ill advised because Company X would thus lose control over the use of its registered caller name. For example, if an outsource contract is terminated or expires, company Y would be still able to authenticate to called parties as "Company X". Likewise, an employee who left the employ of Company X could continue to place calls that were authenticated as originating from Company X.

It is therefore highly desirable to provide transparent caller name authentication for authorized third party callers that permits a registered owner of a caller name to retain control over use of that caller name.

SUMMARY OF THE INVENTION

It is an object of the invention to provide a method and system for transparent caller name authentication for authorized third party callers.

The invention therefore provides a method of providing transparent caller name authentication for authorized third party callers, comprising: receiving a PKI sub-certificate at equipment for authenticating the caller name when a call to a called party is initiated; examining the PKI sub-certificate to determine if it was issued by a caller name owner who registered the caller name in a registry to which the equipment for authenticating the caller name has been subscribed; and establishing an authentication dialogue with a sender of the PKI sub-certificate to authenticate the caller name.

The invention further provides a method of providing transparent caller name authentication for authorized third party callers, comprising issuing a PKI certificate to an owner of a caller name, logo or other means of caller identification, the PKI certificate permitting the owner of the PKI certificate to sign PKI sub-certificates that bear the caller name and to issue one of the PKI sub-certificates to a third party selected by the owner to place caller name authenticated calls on behalf of the owner.

The invention yet further provides outsourced service supplier call equipment for providing transparent caller name authentication to called parties called on behalf of companies that outsource tasks to the outsourced service supplier, comprising: a PKI certificate selector that is used to select a PKI sub-certificate signed by a one of the companies that outsourced a task to the outsource service provider; and call control equipment for establishing a call to a called party associated with the task, and for sending the selected PKI sub-certificate to a call authentication application that authenticates the caller name on behalf of the called party.

The invention also provides Call center call equipment for providing transparent caller name authentication to a called party called on behalf of a company that outsourced tasks to the call center, comprising: a PKI certificate selector that is used to select a PKI sub-certificate signed by the company that outsourced a task to the call center; call control equipment for establishing a call to a called party associated with the outsourced task; and caller name authentication equipment for sending the selected PKI sub-certificate to a call authentication application that authenticates the caller name on behalf of the called party in order to convey a caller name authentication message to the called party.

BRIEF DESCRIPTION OF THE DRAWINGS

Further features and advantages of the present invention will become apparent from the following detailed description, taken in combination with the appended drawings, in which.

DETAILED DESCRIPTION OF PREFERRED EMBODIMENTS

The invention provides transparent caller name authentication for registered third parties that provide service on behalf of an owner of a registered caller name. A registered owner of a caller name who outsources certain services or has mobile employees may request a Public Key Infrastructure (PKI) caller name authentication certificate that permits a caller name certificate chain to be created so that the PKI certificate owner may issue signed sub-certificates to third party subcontractors or mobile employees who may need to place authenticated calls that appear to have been originated by the registered owner of the caller name. When a called party receives a call from the third party or mobile employee on behalf of the registered owner of the caller name, the registered caller name is authenticated and displayed as if the call had been originated by the registered owner of that caller name. Outsourcing and employee mobility is therefore facilitated, and called parties can be confident that the authenticated caller can be trusted. If an outsource contract (or employment) terminates, the registered owner of the caller name can revoke a sub-certificate it has issued to the contractor (or employee). The PKI certificate chain also permits sub-certificate tracking and audit, which means it becomes possible to track which employee, group or outsource supplier made a particular call. As well as revoking sub-certificates as required, the registered owner may also limit the validity of any sub-certificate it issues, and thus require an explicit sub-certificate re-downloading at predetermined intervals.

Figure 1:
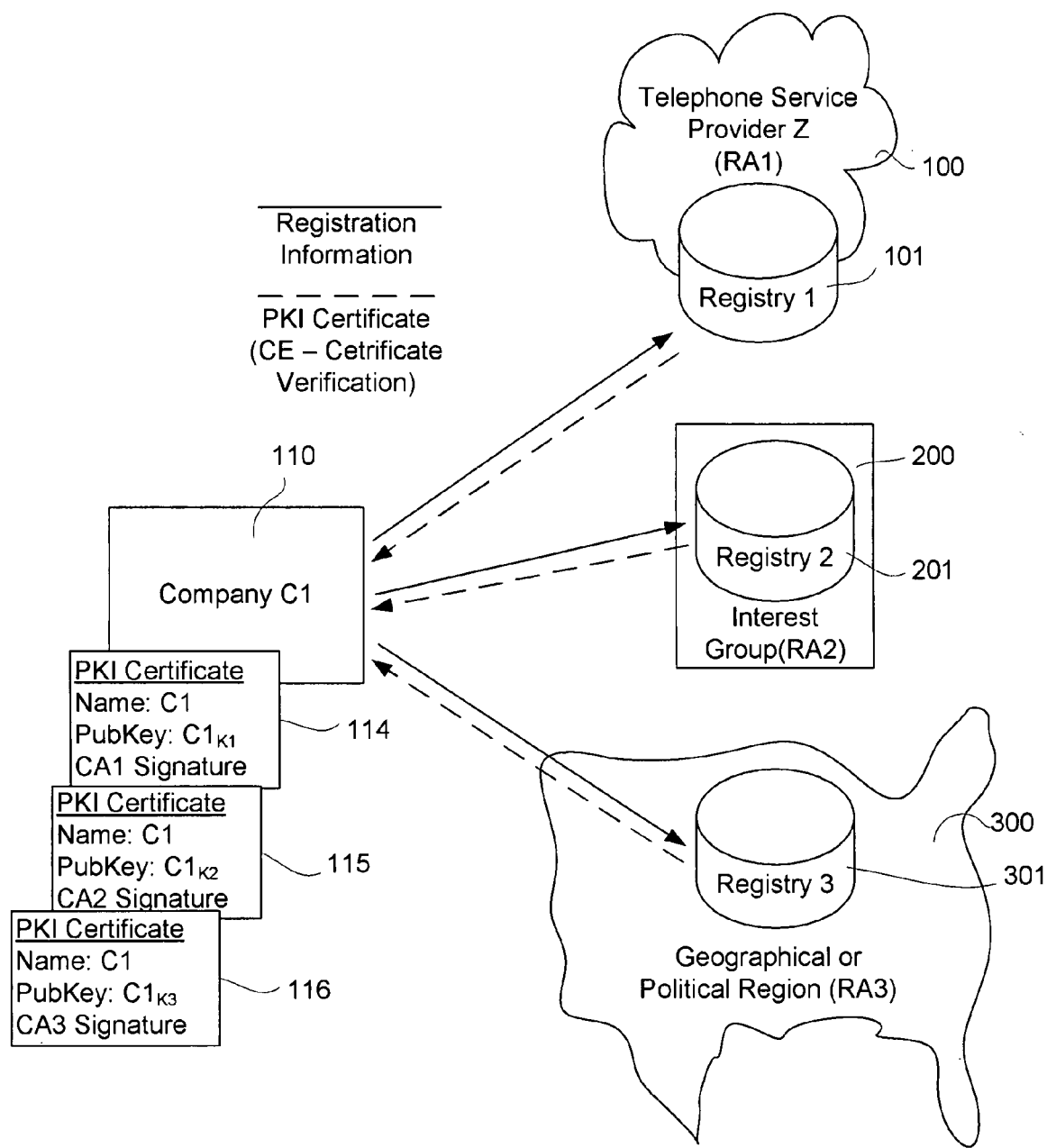
FIG. 1 is a schematic diagram of a registration infrastructure and process for caller name registration in accordance with the invention.

FIG. 1 is a schematic diagram of an exemplary registration infrastructure and a process for registration of caller name, logo or other means of caller identification in accordance with the invention. In this example, a registrant 110 (company C1) registers with three separate registries: registry 101 is operated by a registration authority (RA) that is a telephone service provider 100; registry 201 is operated by a RA that is an interest group (such as a trade association), and registry 301 is operated by a RA that is a geographical or political region (perhaps a government or other official entity). Company C1 110 registers with the RAs to provide authenticated caller name, logo or other caller identification (hereinafter simply "caller name") to called parties that subscribe to any one of the available registries. That is, the caller name of the Company C1 can be authenticated to a called party if and only if the called party subscribes to one or more of the available registries, in this example, registries 101, 201 or 301.

As described in Applicant's above-referenced co-pending United States patent application, each registry is operated by the respective RA. The RA may be any public or private organization interested in providing an authenticated caller name registry. A higher-level RA is not required to sanction a RA that operates a registry in accordance with the invention. End-users, service suppliers, and/or equipment suppliers can determine if any given registry is trustworthy, and subscribe to only those registries determined to be trustworthy. Each registry is composed of two main parts—the Certification Authority and a database of names, logos or other means of caller identification. Each registry serves a predetermined subscriber group, region and/or a predefined interest group. A region served by one registry may overlap a region served by another registry, and two or more registries may serve the same region, or the same interest group.

For example, the registry 101 is operated by a telephone service provider 100 that wishes to provide an authenticated caller service to any company, public or government organization 110 that wishes to provide authenticated caller name to called parties served by the telephone service provider 100.

As a further example, the registry 201 is operated by the interest group 200, such as a bankers association, which maintains the registry 201 to provide authenticated caller registration services to its bank members.

As yet a further example, the registry 301 is associated with a geographical or political region, such as New York State; the Province of Ontario; the City or Toronto; the greater Chicago area; etc. and is operated by a corresponding government agency or other official entity 300.

In one embodiment of the invention, the only responsibility borne by the RAs 100, 200 or 300 is to ensure proof of identity of any registrant 110, and ensure that no duplicate caller names are registered. In this embodiment, the registered caller names in registries 101, 102 and 103 can be freely inspected by the public and it is the responsibility of registrants 110 and other interested parties to police the registries 101, 102 and 103 in order to ensure that a confusingly similar or misleading caller identity is not registered by another registrant 110. When a registrant 110 is registered, the RA issues a PKI certificate 104 (for example, an X.509 certificate, which is well known in the art). The PKI certificate certifies that the registered caller identity is bound to the registrant's public key (which is in turn implicitly paired with the registrant's private key). If requested, the PKI certificate also permits the registrant 110 to issue PKI certificates to third parties authorized to place authenticated calls using the registrant's registered name, logo or other means of identification. In the case of an X.509 certificate, this is accomplished by adding a critical extension to the X.509 certificate that permits the owner of the X.509 certificate to sign X.509 sub-certificates bearing its caller name, and to issue those sub-certificates to others at its own discretion.

Registration Process

In one embodiment of the invention, the registration process proceeds as follows, using RA 100 as an example:

1) The RA 100 publishes its public key in its root PKI certificate. This public key is used to verify certificates, so the root certificate must be imported into each device that will perform the caller name authentication. Typically, it is assumed a vendor of a telephone will pre-load the PKI root certificates of interest—including any local regional registries, all popular trade and professional registries, etc. in much the same way that Web browsers are preloaded with PKI certificates today. There should also be a way for the end user to import more root certificates in the cases where the end user does business in multiple regions or is interested in a specialized registry. As understood by those skilled in the art, there is no limit to how many root public keys can be imported.

2) Each company wishing to become a registrant 110, generates its own public/private key pair, submits the public key to the RA 100 along with its name, logo or other means of identification, any other required registration information and/or documentation, and a request a certificate that permits the company to sign PKI sub-certificates for authorized third parties.

3) If the RA 100 determines that the applicant in fact owns the name, logo, or other means of caller identification, the RA 100 enters the caller name into the database 100 and uses the private key of RA 100 to sign a PKI certificate that includes the registrant's caller name, the registrant's public key, and the requested critical extension.

The RA 100 therefore "vouches" that the registrant's public key is the public key that is bound to the registrant's caller name, that the registrant is entitled to use that caller name, and is entitled to issue PKI sub-certificates to third parties that are authorized to use the registered caller name, logo or other means of identification to place authenticated calls.

4) The registrant 110 now has a signed authentication certificate that attests to its caller name, and the registrant 110 also has the private key that permits the registrant 110 to validate that certificate. The signed authentication certificate only signifies that the holder of the private key (Company C1) is entitled to have its caller name displayed in the jurisdiction of the particular registration authority 100 with which the registrant 110 has registered, and that the holder of the PKI certificate can issue one or more PKI sub-certificates to third parties who are entitled to use the Company C1's name for making authenticated calls.

Figure 2:
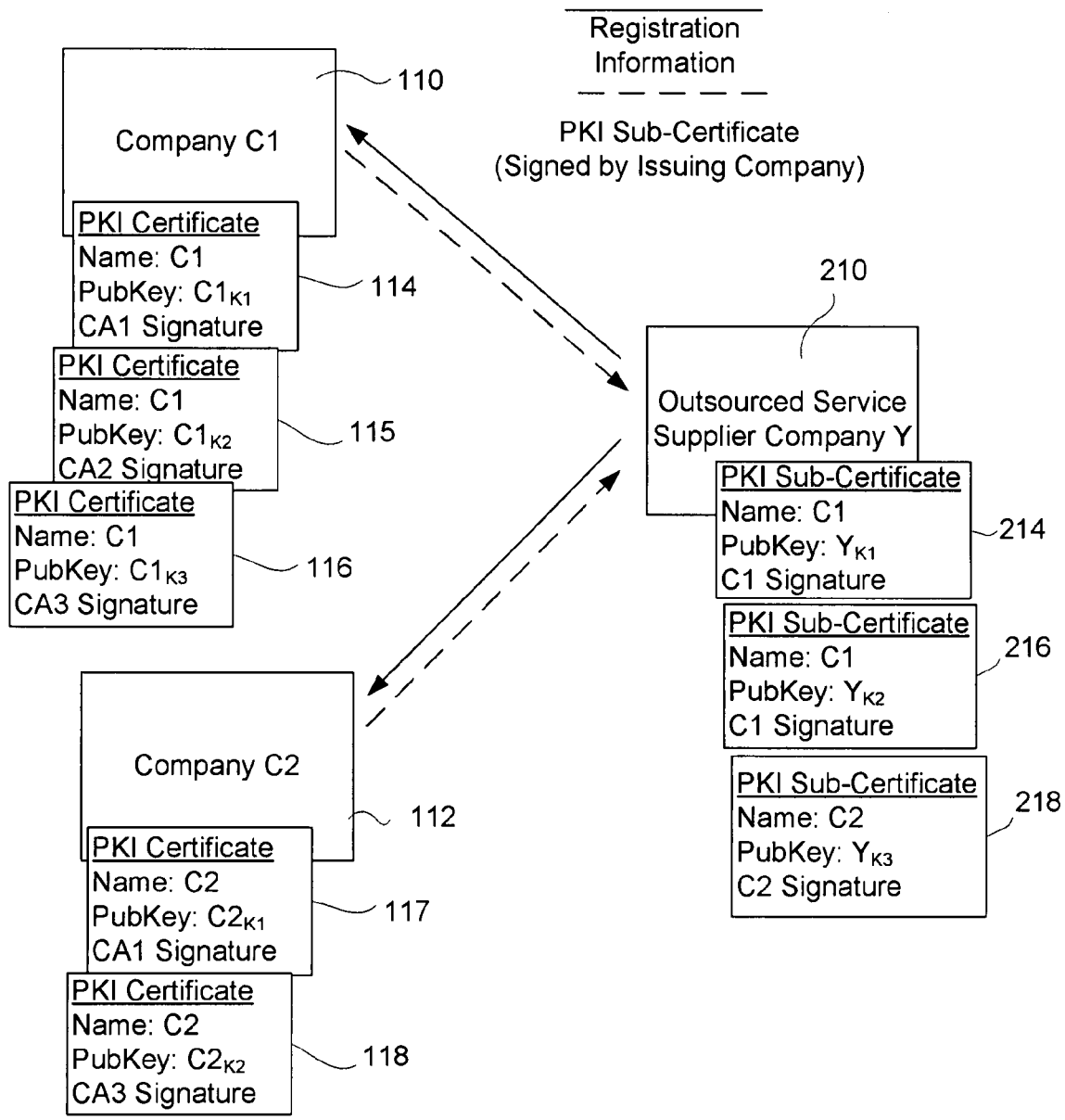
FIG. 2 is a schematic diagram of authorized third party registration for transparent caller name authentication in accordance with the invention.

FIG. 2 is a schematic diagram illustrating a registration process used by authorized third parties to obtain PKI sub-certificates in accordance with the invention. When an outsourced service supplier 210 (Company Y, or a mobile employee, for example) needs to place calls on behalf of an owner of a registered caller name, logo or other form of caller identification, such as Company C1 110 or Company C2 112, the outsourced service supplier 210 generates a public/private key pair and sends it along with any other required registration information to the registered caller name owner 110, 112 for which it performs outsourced services. The registered caller name owner 110, 112 verifies the registration information and, if the registration information proves valid, issues a PKI sub-certificate to the outsourced service supplier 210. The PKI sub-certificate is bound to the caller name, logo or other form of caller identification owned by the respective registered caller name owner 110, 112 and to the public key provided by the outsourced service supplier 210. The PKI sub-certificate is signed by the respective caller name owner 110, 112.

As shown in FIG. 2, the Company C1 110 owns three PKI certificates: PKI certificate 114 issued by the RA 100; PKI certificate 115 issued by the RA 200; and PKI certificate 116 issued by the RA 300. Company C2 112 owns two PKI certificates: PKI certificate 117 issued by RA 100; and, PKI certificate 118 issued by RA 300. The outsourced service supplier 210 receives two PKI sub-certificates from Company C1: PKI sub-certificate 214 signed by Company C1, which can be used to authenticate the registered caller name of Company C1 to called parties that subscribe to the registry 101; and, PKI sub-certificate 216 signed by Company C1, which can be used to authenticate the registered name of Company C1 to called parties that subscribe to the registry 301. The outsourced service supplier 210 also receives one PKI sub-certificate from Company C2: PKI sub-certificate 218 signed by Company C2, which can be used to authenticate the registered caller name of Company C2 to called parties that subscribe to the registry 301. As will be understood by those skilled in the art, the number of PKI sub-certificates that can be issued to the outsourced service supplier 210 is under complete control of the registered caller name owner, who can selectively issue or revoke sub-certificates associated with any given registry with which the caller name, logo or other form of caller identification has been registered.

Figure 3:
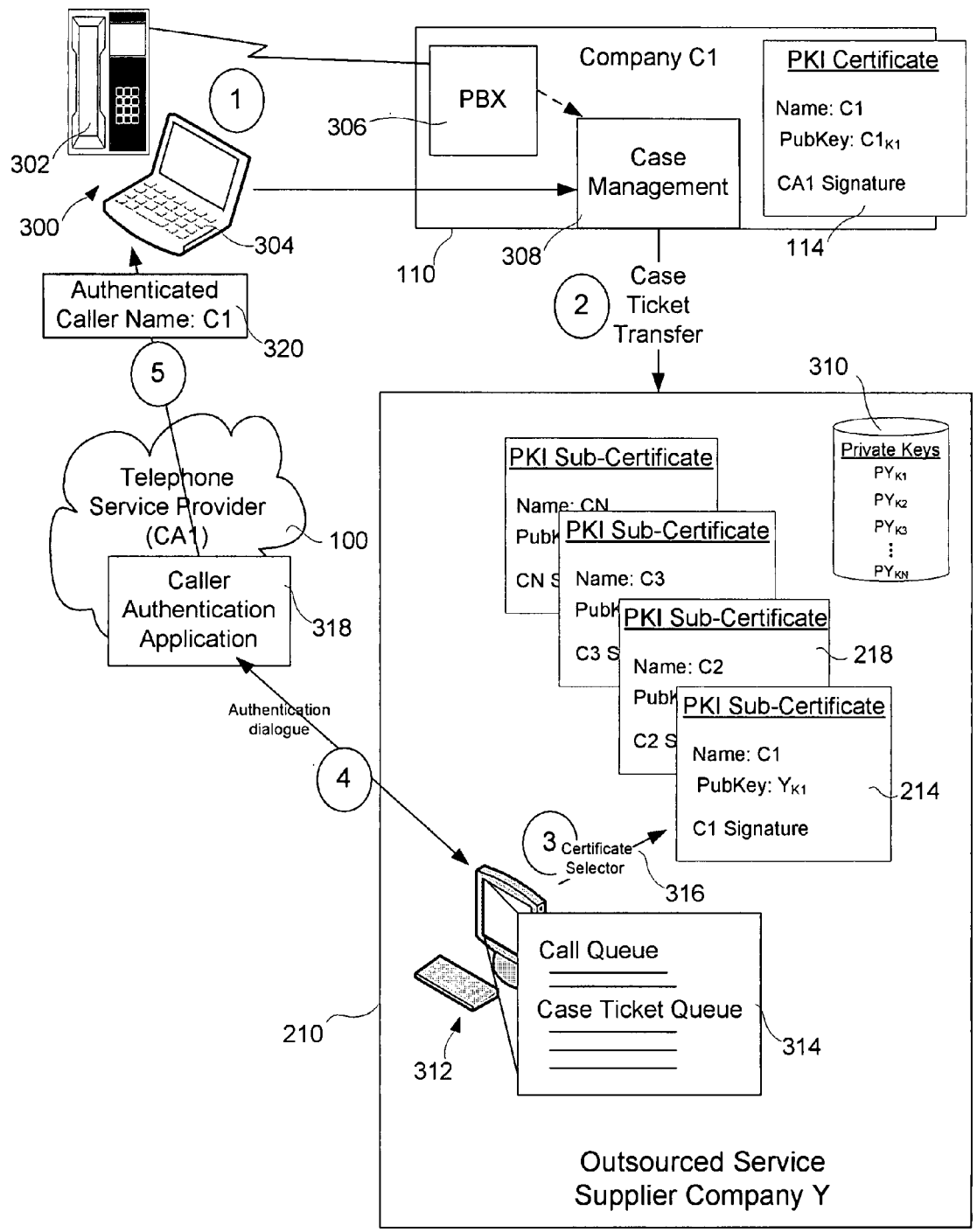
FIG. 3 is a schematic diagram illustrating transparent caller name authentication in accordance with the invention.

FIG. 3 is a schematic diagram illustrating the use of PKI sub-certificates in accordance with the invention issued to an outsourced service supplier (Company Y) 210 by a registered caller name owner 110 (Company C1). In this example, use of the PKI sub-certificate proceeds in five stages as follows:

1) A customer 300 using a telephone device 302 or a computer 304 sends an inquiry to Company C1 by placing a call to a PBX 306 or by sending an e-mail in a manner well known in the art, or the like. The Company C1 is owner of the PKI certificate 114, as explained above with reference to FIGS. 1 and 2. The inquiry is routed to a case management system 308 and converted into a case ticket (not shown), also in a manner well known in the art.

2) The case management system 308 determines that the case ticket is associated with a task that has been outsourced to the outsourced service supplier 210 (Company Y), and the case ticket is transferred to the outsourced service supplier 210 using any known data transfer protocol.

3) In this example the outsourced service supplier 210 (Company Y) is a call center that performs outsourced services for a plurality of different companies, including Company C1 and Company C2. The outsourced service supplier 210 therefore maintains a database 310 of private keys, one private key paired with the public key of each of the PKI sub-certificates owned by the outsourced service supplier 210. The private keys are used in a Public Key based authentication dialog using a protocol negotiated between the outsourced service provider 210 and caller authentication application 318, in a manner well known in the art. The case ticket sent from Company C1 is placed in a case ticket queue of a display 314 that appears on a work station 312 operated by a call agent (not shown) of the outsourced service supplier 210. The call agent uses a certificate selector 316 to select the PKI sub-certificate 214 associated with the Company C1 to provide authenticated caller name for a call to be placed to the customer 300. Alternatively, the certificate selector 316 may operate automatically to associate the PKI sub-certificate of Company C1 with the call to be placed, which is entered in a call queue displayed by the display 314. In this case, the selection of the PKI sub-certificate is transparent to the call agent.

4) When the call center call equipment, or the call agent operating work station 312, places the call to the customer 300, the PKI sub-certificate 214 is sent to the telephone service provider 100 by call center caller name authentication equipment, for example software associated with the call agent workstation 312. In one embodiment of the invention, the PKI sub-certificate is sent to the caller authentication application 318 by the caller name authentication equipment via a data path that is independent of the call setup signaling path. When the PKI sub-certificate is received by the caller authentication application 318, the authentication dialogue established between the caller name authentication equipment and the caller authentication application 318 is used to authenticate the caller name, as described in Applicant's co-pending patent application referenced above. The validation of the received PKI sub-certificate is slightly more complicated than the verification of a top level PKI certificate. The validation of a top level certificate can rely on the received certificate being signed by the RA. In the case of the sub-certificate, the received PKI sub-certificate must be signed by the registered caller name owner certificate, and the registered caller name owner certificate must be signed by the RA. In general, the received PKI certificate must be signed by another PKI certificate, and the chain must end up at a known and trusted root certificate that has been pre-imported into the caller authentication application 318. Furthermore, each PKI certificate in the chain must be valid and non-revoked.

5) The authenticated caller name 320 of Company C1 is extracted from the verified PKI sub-certificate, and a caller authentication message including the authenticated caller name is conveyed to the customer 300 by the caller authentication application 318. The caller authentication message may be conveyed to the called customer 300 in a variety of ways, as described in Applicant's co-pending patent application referenced above. The caller authentication message is displayed, for example, on the telephone 302 of the customer 300. Because the caller name has been authenticated, the customer 300 is assured that the response to his inquiry has originated from Company C1 and the fact that the work was outsourced is transparent to the customer 300. Outsourcing is thereby facilitated and customer confusion is eliminated.

As will be understood by those skilled in the art, although the invention has been described with reference to a call center, the invention is equally applicable to any subcontractor, mobile employee, or other third party who establishes telephone contact with customers, suppliers, or others reliant on caller name authentication.

As will be further understood by those skilled in the art, although the invention has been described with explicit reference to X.509 certificates, the invention is applicable to any system of Public Key Infrastructure that permits "chaining" of certificate.

As will be yet further understood by those skilled in the art, the specific embodiments of the invention described above are not exhaustive of the methods, applications, or conveyances by which the invention can be implemented. The embodiments of the invention described above are therefore intended to be exemplary only, and the scope of the invention is intended to be limited solely by the scope of the appended claims.

We claim:

1. A method of providing transparent caller name authentication for authorized third party callers, the method comprising:
   receiving a PKI sub-certificate at equipment for authenticating the caller name when a call to a called party is initiated;
   examining the received PKI sub-certificate to determine if it was issued by a caller name owner who registered the caller name in a registry to which the equipment for authenticating the caller name has been subscribed, wherein the PKI sub-certificates are selectively revocable by the registered caller name owner; and
   establishing an authentication dialog with a sender of the received PKI sub-certificate to authenticate the caller name.

2. The method as claimed in claim 1, further comprising:
   conveying a caller name authentication message to the called party.

3. The method as claimed in claim 2, wherein conveying the caller name authentication message comprises:
   extracting the caller name from the PKI sub-certificate and sending the extracted caller name in the caller name authentication message conveyed to the called party.

4. The method as claimed in claim 1, wherein receiving the PKI sub-certificate comprises:
   receiving the PKI sub-certificate during call setup over a path separate from a call setup signaling path for the call.

5. The method as claimed in claim 1, performed by a caller authentication application executed by the equipment that authenticates the caller name.

6. The method as claimed in claim 1, wherein the PKI sub-certificate comprises an X.509 certificate.

7. Outsourced service supplier call equipment for providing transparent caller name authentication to called parties called on behalf of companies that outsource tasks to the outsourced service supplier, comprising:
   a PKI certificate selector configured to select a PKI sub-certificate signed by a company that outsourced a task to the outsource service provider and is an owner of a registered caller name, wherein the PKI sub-certificates are selectively revocable by the company; and
   call control equipment configured to establish a call to a called party associated with the task, and configured to send the selected PKI sub-certificate to a call authentication application that authenticates the registered caller name on behalf of the called party.

8. The outsourced service supplier call equipment as claimed in claim 7, further comprising:
   a call agent workstation configured to permit a call agent to operate the certificate selector to manually select the PKI sub-certificate to be sent to the call authentication application.

9. The outsourced service supplier call equipment as claimed in claim 7, wherein the call selector automatically selects the PKI sub-certificate and associates the selected PKI certificate with the call established to the called party.

10. The outsourced service supplier call equipment as claimed in claim 7, wherein the call control equipment sends the PKI sub-certificate via a data path that is separate from a call setup signaling path for the call.

11. The outsourced service supplier call equipment as claimed in claim 7, wherein the PKI sub-certificate is an X.509 certificate.

12. The outsourced service supplier call equipment as claimed in claim 7, further comprising:
    a database of private keys containing one private key associated with each PKI sub-certificate owned by the outsourced service supplier.

13. Call center call equipment for providing transparent caller name authentication to a called party called on behalf of a company that outsourced tasks to the call center, comprising:
    a PKI certificate selector configured to select a PKI sub-certificate signed by the company that outsourced a task to the call center and is an owner of a registered caller name, wherein the PKI sub-certificates are selectively revocable by the company;
    call control equipment configured to establish a call to a called party associated with the outsourced task; and
    caller name authentication equipment configured to send the selected PKI sub-certificate to a call authentication application that authenticates the registered caller name on behalf of the called party in order to convey a caller name authentication message to the called party.

14. The call center call equipment as claimed in claim 13, further comprising:
    a call agent workstation configured to permit a call agent to operate the certificate selector to manually select the PKI sub-certificate to be sent to the call authentication application.

15. The call center call equipment as claimed in claim 13, wherein the call selector automatically selects the PKI sub-certificate and associates the selected PKI certificate with the call to be established to the called party.

16. The call center call equipment as claimed in claim 13, wherein the caller name authentication equipment sends the PKI sub-certificate via a data path that is separate from a call setup signaling path for the call.

17. The call center call equipment as claimed in claim 13, wherein the PKI sub-certificate is an X.509 certificate.

18. The call center call equipment as claimed in claim 13, further comprising:
    a database of private keys containing one private key associated with each PKI sub-certificate owned by the outsourced service supplier.

* * * * *